US012452122B2

(12) United States Patent
Titon et al.

(10) Patent No.: US 12,452,122 B2
(45) Date of Patent: Oct. 21, 2025

(54) ANOMALOUS METRICS MITIGATION PROPOSAL SYSTEM IN A CLOUD COMPUTING SYSTEM

(71) Applicant: Microsoft Technology Licensing, LLC, Redmond, WA (US)

(72) Inventors: Myriam Titon, Jerusalem (IL); Rachel Lemberg, Herzliya (IL); Michael Alburquerque, Tel Aviv-Jaffa (IL); Yaniv Lavi, Tel Aviv-Jaffa (IL); Eliya Habba, Jerusalem (IL); Jeremy Samama, Netanya (IL); Hagit Grushka, Lehavim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 18/635,864

(22) Filed: Apr. 15, 2024

(65) Prior Publication Data

US 2025/0080396 A1    Mar. 6, 2025

Related U.S. Application Data

(60) Provisional application No. 63/535,953, filed on Aug. 31, 2023.

(51) Int. Cl.
*H04L 43/08* (2022.01)
*H04L 41/0631* (2022.01)
(Continued)

(52) U.S. Cl.
CPC .......... *H04L 41/0631* (2013.01); *H04L 43/08* (2013.01)

(58) Field of Classification Search
CPC . H04L 41/0631; H04L 43/08; H04L 63/1425; H04L 43/045; G06F 21/56; G06F 16/35; G06F 21/566
(Continued)

(56) References Cited

U.S. PATENT DOCUMENTS

| 11,748,568 B1* | 9/2023 | Orhan | H04L 41/16 |
| | | | 709/224 |
| 2019/0222597 A1* | 7/2019 | Crabtree | H04L 43/045 |

(Continued)

OTHER PUBLICATIONS

Baynash, et al., "Supported metrics with Azure Monitor", Retrieved from: https://learn.microsoft.com/en-us/azure/azure-monitor/reference/supported-metrics/metrics-index, Sep. 19, 2023, 16 Pages.
(Continued)

*Primary Examiner* — Jude Jean Gilles
(74) *Attorney, Agent, or Firm* — Ray Quinney & Nebeker P.C.; Christopher K. Hallstrom

(57) ABSTRACT

The disclosure relates to utilizing an anomaly mitigation proposal system to determine root causes, summarize anomalous metrics, and report mitigation actions for service incidents in cloud computing systems. Based on receiving an incident report request, the anomaly mitigation proposal system utilizes a two-layer approach that implements large generative language models to generate incident reports that include clear and concise text narratives summarizing metric anomalies, root causes, and corresponding mitigation actions. For example, the anomaly mitigation proposal system initially utilizes an online generative language model to provide these incident reports and, when unavailable within a time threshold, a fallback model that references root cause datastores.

20 Claims, 9 Drawing Sheets

(51) Int. Cl.
*H04L 43/045* (2022.01)
*G06F 16/35* (2025.01)
*G06F 21/56* (2013.01)

(58) Field of Classification Search
USPC .......................................................... 709/224
See application file for complete search history.

(56) References Cited

U.S. PATENT DOCUMENTS

2022/0083898 A1\* 3/2022 Shukla ................... G06N 20/10
2022/0377093 A1\* 11/2022 Crabtree ............... H04L 43/045

OTHER PUBLICATIONS

Chen, et al., "Empowering Practical Root Cause Analysis by Large Language Models for Cloud Incidents", arXiv preprint arXiv:2305. 15778, May 25, 2023, pp. 1-15.
International Search Report Received in PCT Application No. PCT/US2024/039966, mailed on Nov. 20, 2024, 13 pages.

\* cited by examiner

ANOMALOUS METRICS MITIGATION PROPOSAL SYSTEM IN A CLOUD COMPUTING SYSTEM

CROSS-REFERENCE TO RELATED APPLICATIONS

This application claims the benefit of and priority to U.S. Provisional Application No. 63/535,953 filed Aug. 31, 2023, the entirety of which is incorporated herein by reference.

BACKGROUND

In recent years, significant progress has been witnessed in both hardware and software within computing devices, with a particularly notable focus on advancements in cloud computing systems. These systems offer a wide spectrum of services and applications to users. However, occasional service incidents and outages can disrupt network systems and user experiences. Addressing the reasons behind these incidents has become a priority for users. Regrettably, current systems offer suboptimal insights regarding service incidents and corresponding metric anomalies. To elaborate, numerous existing systems rely on rigid methodologies that tend to become obsolete and struggle to accommodate various combinations of metric anomalies associated with service incidents. Additionally, certain systems employ machine-learning models to provide information about service incidents and metric anomalies, but these models are often unavailable and occasionally yield inaccurate solutions. Consequently, existing systems encounter challenges of inefficiency, inaccuracy, and inflexibility when attempting to identify, analyze, and provide summary insights, reports, and preventative measures for service incidents and corresponding metric anomalies within cloud computing systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
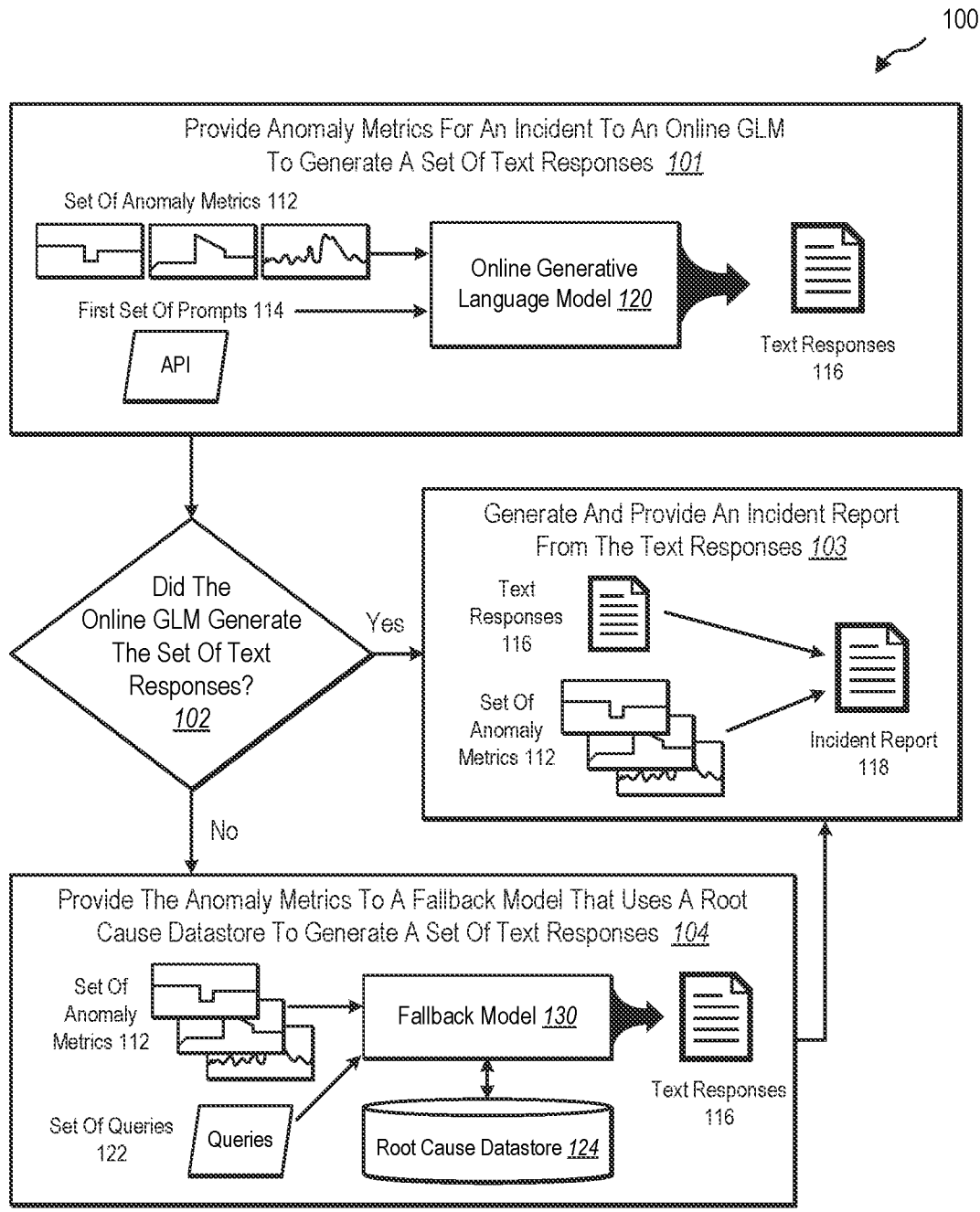
FIG. 1 illustrates an example overview for implementing the anomaly mitigation proposal system to generate clear and concise incident reports based on anomalous metrics using generative language models.

This disclosure describes utilizing an anomaly mitigation proposal system to accurately, flexibly, and efficiently determine root causes, summarize anomalous metrics, and report mitigation actions for service incidents in cloud computing systems. Based on receiving an incident report request, the anomaly mitigation proposal system utilizes a two-layer approach that implements large generative language models to generate incident reports that include clear and concise text narratives summarizing metric anomalies, root causes, and corresponding mitigation actions. For example, the anomaly mitigation proposal system initially utilizes an online generative language model to provide these incident reports and, when unavailable or skipped, a fallback model that references one or more root cause datastores (e.g., root cause databases).

For context, a cloud computing system provides a number of services and applications to users. Periodically, a service incident occurs that impacts systems, services, applications, users, and/or devices. In this disclosure, the term "service incident" (or "incident") refers to an unplanned or unforeseen interruption to a cloud service or application within a cloud computing system. Often, an incident is determined by anomalous metrics monitoring metrics of a service or application and detecting one or more anomalous metrics. In this disclosure, the terms "anomalous metric" and "metric anomaly" refer to a metric that deviates from an anticipated or expected value, trajectory, or range.

When an incident occurs, a user may use a service incident interface to obtain additional information regarding the incident. Currently, service incident interfaces provide users with numerous separate time-series visual graphs corresponding to anomalous metrics. However, many existing systems fail to provide a clear and concise results summary of the metric anomalies in textual form, nor do they provide root causes for the incident or corresponding mitigation actions that can be used to resolve the incident or prevent future incidents. This is particularly true when an incident is reported with a large number of seemingly unrelated anomalous metrics (e.g., not a predefined combination of anomalous metrics) and resource types. Because of the numerous combinations of unrelated anomalous metrics for an incident, the approach that many existing systems take of providing a manual, prewritten solution by a domain expert is not feasible or scalable.

Implementations of the anomaly mitigation proposal system overcome these shortcomings by utilizing a two-layer or two-path approach for summarizing metric anomalies, providing potential root causes, and identifying corresponding mitigation actions. In the first path, the anomaly mitigation proposal system utilizes an online generative language model, such as a large language model (LLM) to generate text narratives for a set of anomalous metrics. When the online generative language model is unsuccessful (or skipped), the anomaly mitigation proposal system utilizes a fallback model that interfaces with one or more root cause datastores (e.g., root cause databases) to generate text narratives for a set of anomalous metrics. The fallback model processes data from the root cause datastore to identify root causes for the set of anomalous metrics. Then, using the text narratives responses from the root cause datastore, the anomaly mitigation proposal system generates and provides an incident report to supplement the graphical results of anomalous metrics with clear and concise textual narratives that summarize the anomalous metrics, identify the root causes, and provide mitigation actions.

To illustrate, in response to receiving an incident report request, in one or more implementations, the anomaly mitigation proposal system provides a set of anomalous metrics and a first set of prompts to an online generative language model to generate text narrative responses. In some instances, the online generative language model provides or returns the text narrative responses, such as before an online model response threshold is met or satisfied. In other instances, when the response threshold has been satisfied before receiving the text narrative responses (e.g., the online generative language model has not provided the text response because it is slow, unresponsive, or unavailable), the anomaly mitigation proposal system provides the set of anomalous metrics and a set of queries to a fallback model for one or more of text responses. In these instances, the fallback model utilizes a root cause datastore to determine a root cause for the set of anomalous metrics. Additionally, the anomaly mitigation proposal system delivers an incident report in response to the incident report request where the incident report includes a summary text response, a root cause text response, and a mitigation text response.

As described in this disclosure, including the following paragraphs, the anomaly mitigation proposal system delivers several significant technical benefits in terms of computing accuracy, flexibility, and efficiency compared to existing systems. Moreover, the anomaly mitigation proposal system provides several practical applications that address problems related to identifying root causes of incidents based on metric anomalies and reporting these root causes and corresponding mitigation actions clearly and concisely.

To illustrate, the anomaly mitigation proposal system implements a two-layer framework that leverages both online and offline large generative language models as well as root cause datastores to efficiently, accurately, and flexibly determine and report root causes for incidents within a cloud computing system. In various instances, the online generative language model provides efficient and accurate results of text narratives in response to a series of prompts for a set of anomalous metrics. In many instances, using generative language models allows the anomaly mitigation proposal system to provide accurate text narrative responses for a wide combination of anomalous metrics. Furthermore, when the online generative language model becomes unavailable (or omitted), the anomaly mitigation proposal system flexibly falls back on the fallback model to provide accurate text responses obtained from one or more root cause datastores, which are generated from an offline generative language model that leverages similar benefits as the online generative language model. Indeed, the fallback model utilizes one or more root cause datastores to determine and provide enhanced results regarding root causes and corresponding mitigation actions.

In one or more implementations, the anomaly mitigation proposal system utilizes additional prompts and actions with the generative language models to ensure accurate results. For example, by utilizing verification prompts that include segments of text narrative responses generated by the model, the anomaly mitigation proposal system validates the accuracy of the text narrative responses. As another example, the anomaly mitigation proposal system utilizes model token output probabilities to assess the general accuracy of the text narrative responses. Then, if the online generative language model produces unreliable results or becomes otherwise unavailable, the anomaly mitigation proposal system flexibly falls back on the fallback model, which utilizes available root cause datastores, to provide accurate and reliable text narrative responses.

As mentioned, the fallback model generates and utilizes root cause datastores (e.g., root cause databases) to accurately determine one or more root causes for a set of anomalous metrics. In various implementations, the anomaly mitigation proposal system leverages an offline generative language model to accurately determine unrecognized connections and mappings between combinations of anomalous metrics and root causes within a root cause datastore. Furthermore, by utilizing various mapping recovery or lookup approaches with the root cause datastores, such as voting functions and similarity scoring functions, the anomaly mitigation proposal system is able to flexibly and accurately determine root causes (and corresponding mitigation actions) for anomalous metrics that would otherwise go undiscovered or unused.

Further, the anomaly mitigation proposal system provides efficient and accurate results by providing clear and concise results that are legible and understandable to users. As mentioned, previous incident reports provide several rows of separate graphs of metric anomalies, which do not provide a comprehensive summary of the metric anomalies. Further, previous incident reports fail to identify any root causes nor do they provide mitigation actions. In contrast, the anomaly mitigation proposal system provides incident reports with brief text narrative responses that include a summary text response, a root cause text response, and a mitigation text response. Moreover, the anomaly mitigation proposal system flexibly adapts to accurately handle combinations of anomalous metrics not previously cataloged, including combinations of different types and corresponding to different resources.

As illustrated in the foregoing discussion, this disclosure utilizes a variety of terms to describe the features and advantages of one or more implementations described. To illustrate, this disclosure describes an anomaly mitigation proposal system in the context of a cloud computing system. As an example, the term "cloud computing system" refers to a network of interconnected computing devices that provide various services and applications to computing devices (e.g., server devices and client devices) inside or outside of the cloud computing system. Additional terms are defined throughout the document in different examples and contexts.

As an example, a "generative language model" (GLM) is a large artificial intelligence system that uses deep learning to produce coherent and contextually relevant text based on patterns learned from large amounts of training data. In various implementations, a generative language model is a multi-modal generative model. In many instances, a generative model refers to an advanced computational system that uses natural language processing, machine learning, and/or image processing to generate coherent and contextually relevant human-like responses. Generative language models include Large Language Models (LLMs), which are primarily based on transformer architectures to understand, generate, and manipulate human language. LLMs can also use a recurrent neural network (RNN) architecture, long short-term memory (LSTM) model architecture, convolutional neural network (CNN) architecture, or another architecture type. Examples of LLMs include generative pre-trained transformer (GPT) models including GPT-3.5 and GPT-4, bidirectional encoder representations from transformers (BERT) model, text-to-text transfer transformer models such as T5, conditional transformer language (CTRL) models, and turning-NLG. Other types of generative language models include sequence-to-sequence models (Seq2Seq), vanilla RNNs, and LSTM networks.

Generative language models are trained on a vast dataset and can produce fluent, coherent, and topic-specific outputs (e.g., text and/or images). Generative language models have applications in natural language understanding, content generation, text summarization, dialog systems, language translation, creative writing assistance, and image generation. A single generative language model performs a wide range of tasks based on receiving different inputs, such as prompts (e.g., input instructions, rules, example inputs, example outputs, and/or tasks), data, and/or access to data. In response, the generative language model generates various output formats ranging from one-word answers to long narratives, images and videos, labeled datasets, documents, tables, and presentations.

This disclosure includes "online generative language models" and "offline generative language models." In various implementations, the models may be the same or similar models. For example, the online generative language model and/or the offline generative language may be fine-tuned with anomaly-based literature or other specific anomaly metric documentation to better process metric anomalies. While online generative language models quickly process incoming requests, offline generative language models can be used as a part of fallback models to generate root cause datastores that map root causes to metric anomalies. A root cause datastore includes mappings between root causes and corresponding mitigation actions. In some implementations, the fallback model takes longer to provide responses when accessing the root cause datastores (e.g., root cause databases).

Additional example implementations and details of the anomaly mitigation proposal system are discussed in connection with the accompanying figures, which are described next. For example, FIG. 1 illustrates an example overview for implementing the anomaly mitigation proposal system to generate clear and concise incident reports based on anomalous metrics using generative language models in accordance with one or more implementations. As shown, FIG. 1 illustrates a state diagram example that includes a series of acts 100 performed by the anomaly mitigation proposal system within a cloud computing system.

As shown, the series of acts 100 includes the act 101 of providing anomalous metrics for an incident to an online GLM (e.g., an online LLM) to generate a set of text responses. In response to receiving an incident report request for an incident, the anomaly mitigation proposal system obtains a set of anomalous metrics 112 corresponding to the incident. The anomaly mitigation proposal system then provides the set of anomalous metrics 112 to an online generative language model 120, such as an online GLM. Additionally, the anomaly mitigation proposal system provides a first set of prompts 114 directing the online GLM to process the set of anomalous metrics 112, summarize them, and generate text responses 116 (e.g., text narrative responses) regarding the incident. In various implementations, the anomaly mitigation proposal system provides the first set of prompts within one or more application programming interface (API) calls. Additional examples of receiving an incident report request, obtaining anomalous metrics, and providing the first set of prompts are provided below in connection with FIG. 3 and FIG. 7.

As shown, the series of acts includes the act 102 of determining whether the online GLM generates the set of text responses. Commonly, when an incident report is received, the anomaly mitigation proposal system is expected to quickly generate and return the report. Accordingly, as part of generating the report, the anomaly mitigation proposal system utilizes an online model response threshold to ensure a quick report delivery. For example, upon providing the set of anomalous metrics 112 and the first set of prompts 114 to the online generative language model 120, the anomaly mitigation proposal system may initiate the response timer or determine whether it receives indications of the online generative language model 120 being unavailable or unresponsive. The anomaly mitigation proposal system determines whether the text responses 116 are received. For instance, the anomaly mitigation proposal system determines if text narrative responses were received before a threshold response time expires, which may signal the online GLM being unavailable. In another instance, the response threshold is satisfied, triggered, and/or activated when an error, message, or other indication is received signaling the online generative language model 120 as being unavailable or unresponsive (e.g., the online GLM returns an error message indicating its unavailability).

When the anomaly mitigation proposal system receives the text responses 116 from the online GLM (e.g., online LLM), it proceeds to the act 103 of generating and providing an incident report from the text responses. For example, the anomaly mitigation proposal system generates an incident report 118 by compiling the text responses 116 with visual graphs of the set of anomalous metrics 112. Additional details regarding incident reports are provided below in connection with FIG. 3 and FIG. 7.

Otherwise, if the anomaly mitigation proposal system does not receive the text responses 116 from the online GLM within the threshold response time, the anomaly mitigation proposal system provides the anomalous metrics to a fallback model that uses a root cause datastore (e.g., root cause database) to generate a set of text responses, as shown in the act 104. In particular, the anomaly mitigation proposal system provides the set of anomalous metrics 112 and a set of queries 122 to a fallback model 130, which utilizes a root cause datastore 124 to determine the text responses 116, including potential root causes of the set of anomalous metrics 112. In some instances, the anomaly mitigation proposal system omits the online generative language model 120 and starts the series of acts 100 with act 104 directly using the fallback model 130.

In various implementations, the fallback model accesses a large number of root cause datastores that provide mappings between root causes and anomalous metrics where one or more root cause datastores are generated and/or updated from an offline generative language model. Accordingly, the root cause datastores provide root cause data obtained from mappings between root causes and combinations of metric anomalies, which the fallback model 130 utilizes to determine a root cause for the set of anomalous metrics 112. In some implementations, there is a single root cause datastore. As described further below in connection with FIG. 4 and FIG. 5, the anomaly mitigation proposal system may utilize various functions to map root causes with anomalous metrics including when explicit mappings are absent from a root cause datastore.

Upon receiving the text responses 116 from the fallback model 130, the anomaly mitigation proposal system generates the incident report, as shown again in the act 103. Additionally, the anomaly mitigation proposal system may provide the incident report to a requesting client device in response to the incident report request. As further described below, the incident report 118 includes a summary text response of the anomalous metrics, a root cause text response providing one or more root causes of the anomalous metrics, and a mitigation text response that includes mitigation actions to fix or mitigate current anomalies and/or prevent future occurrences of the anomalous metrics.

Figure 2:
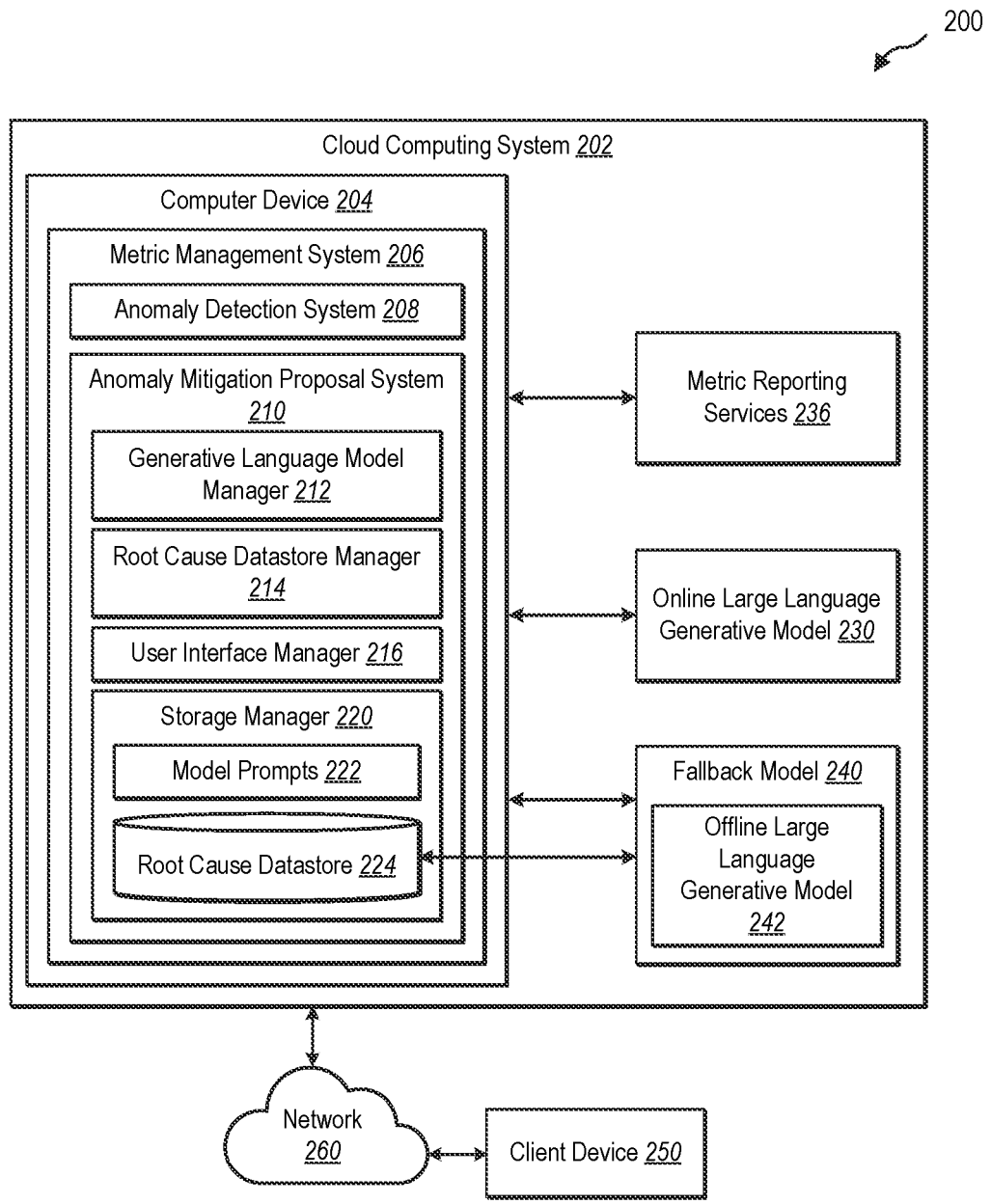
FIG. 2 illustrates an example computing environment where an anomaly mitigation proposal system is implemented in a cloud computing system.

With a general overview in place, additional details are provided regarding the components, features, and elements of the anomaly mitigation proposal system. To illustrate, FIG. 2 shows an example computing environment where the anomaly mitigation proposal system is implemented. In particular, FIG. 2 illustrates an example of a computing environment 200 of various computing devices associated with an anomaly mitigation proposal system 210. While FIG. 2 shows example arrangements and configurations of an anomaly mitigation proposal system and associated components, other arrangements and configurations are possible.

As shown, the computing environment 200 includes a cloud computing system 202 and a client device 250 connected via a network 260. The cloud computing system 202 includes a computing device 204, metric reporting services 236, an online generative language model 230, and a fallback model 240 having an offline generative language model 242, which may be implemented on one or more computing devices, such as a set of server devices. The computing device 204, which implements the anomaly mitigation proposal system 210, may also be one or more server devices. Further details regarding these and other computing devices are provided below in connection with FIG. 8 along with additional details regarding networks, such as the network 260 shown.

The computing device 204 implements a metric management system 206 having an anomaly detection system 208 and the anomaly mitigation proposal system 210. In various implementations, the anomaly mitigation proposal system 210 generally provides interfaces, tools, services, and frameworks to users for providing information regarding metric anomalies and service incidents.

In some instances, the anomaly detection system 208 determines metric anomalies from service metrics within the cloud computing system 202 associated with a user. For example, the anomaly detection system 208 communicates with the metric reporting services 236 to receive metrics for a user and determine metric anomalies that occur. The anomaly detection system 208 may provide sets of metric anomalies to the anomaly mitigation proposal system 210 as part of generating an incident report.

As mentioned earlier, the anomaly mitigation proposal system 210 generates incident reports that provide clear and concise text narratives for metric anomalies along with potential root causes and corresponding remedies. As shown, the anomaly mitigation proposal system 210 includes various components and elements, which are implemented in hardware and/or software. For example, the anomaly mitigation proposal system 210 includes a generative language model manager 212, a root cause datastore manager 214, a user interface manager 216, and a storage manager 220 having model prompts 222 and a root cause datastore 224.

In various implementations, the generative language model manager 212 communicates with the online generative language model 230 and the offline generative language model 242 within the fallback model 240 to generate text narrative responses. For example, the generative language model manager 212 provides model prompts 222 to the online generative language model 230 along with anomalous metrics corresponding to an incident. In various implementations, the generative language model manager 212 also determines when to send model prompts 222 and anomalous metrics to the fallback model 240 when the online generative language model 230 is unresponsive or unavailable.

In one or more implementations, the root cause datastore manager 214 oversees the management of the root cause datastore 224 (e.g., root cause database). For example, the root cause datastore manager 214 collaborates with the fallback model 240 in accessing the root cause datastore 224 and/or the offline generative language model 242 in generating root cause mappings. In various implementations, the root cause datastore 224 is located outside of the anomaly mitigation proposal system 210 and/or computing device 204, such as on a separate network storage device. In various implementations, the root cause datastore 224 is a JavaScript Object Notation (JSON), Extensible Markup Language (XML), or other data formats or structures. While a root cause datastore is described in this disclosure, in some instances, root cause mappings are stored in one or more databases, tables, data stores, or other data structures.

In some implementations, the user interface manager 216 implements the delivery of incident reports to users in the case of a service incident. For example, the user interface manager 216 works with the anomaly mitigation proposal system 210 to enhance incident reports with clear and concise text narratives of the incident, which may also include graphical representations of the anomalous metrics.

As shown, the cloud computing system 202 includes the client device 250. In various implementations, the client device 250 is associated with a user (e.g., a user client device), such as an administrator who interacts with the anomaly mitigation proposal system 210 to request and receive incident reports. For example, the client device 250 includes a client application, such as a web browser or another form of computer application for accessing the anomaly mitigation proposal system 210 and/or interacting with the anomaly mitigation proposal system 210.

Figure 3:
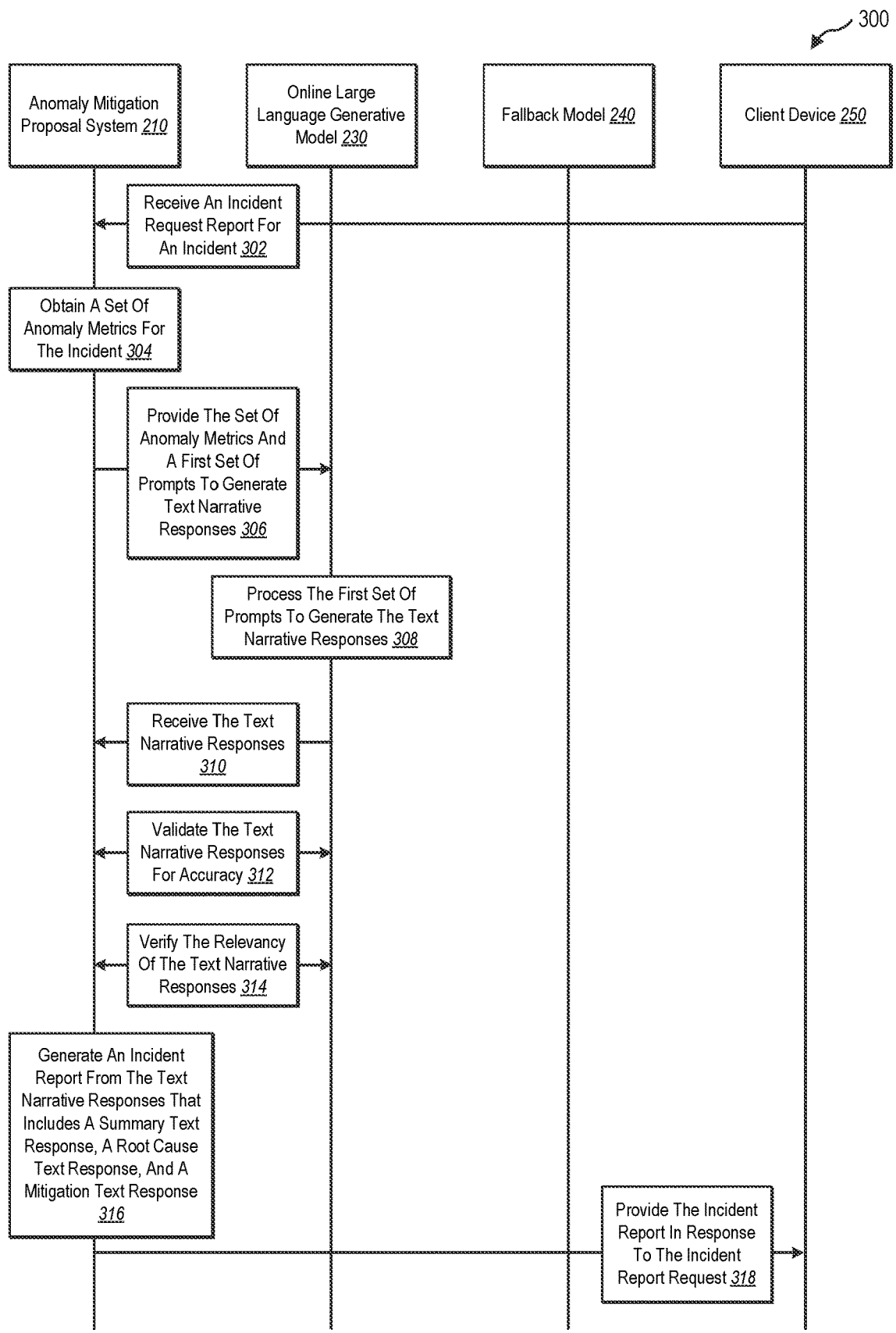
FIG. 3 illustrates an example sequence flow diagram of determining an incident report that includes a root cause analysis of a service incident utilizing an online generative language model.
Figure 4:
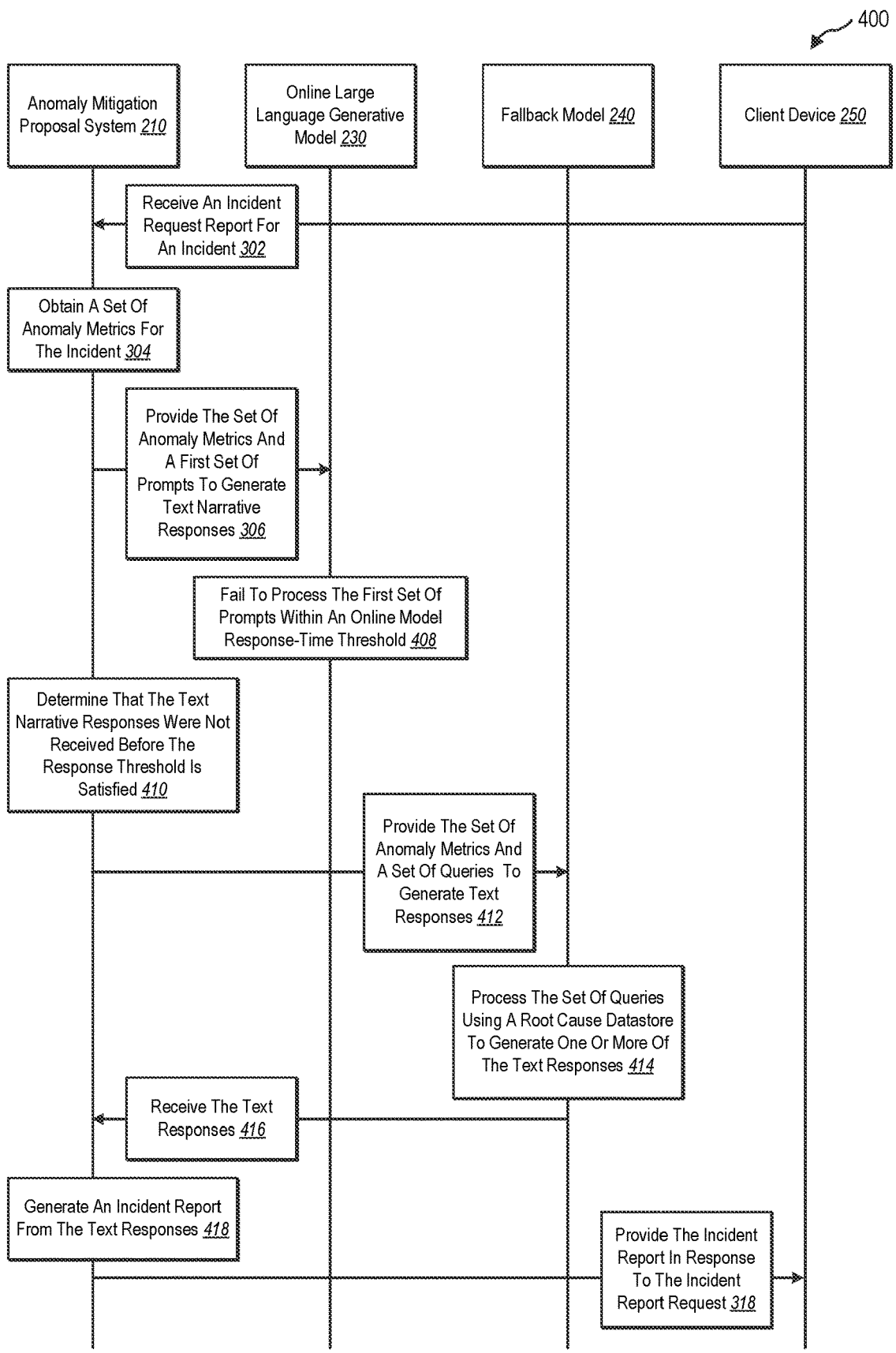
FIG. 4 illustrates an example sequence flow diagram of determining an incident report that includes a root cause analysis of a service incident utilizing a fallback model and a root cause datastore.

FIG. 3 and FIG. 4, which are described next, provide examples and additional details regarding receiving and generating incident reports. Specifically, FIG. 3 presents the anomaly mitigation proposal system 210 utilizing an online generative language model. FIG. 4 extends this to include the fallback model. Both FIG. 3 and FIG. 4 feature the anomaly mitigation proposal system 210, the online generative language model 230, the fallback model 240, and the client device 250.

As previously mentioned, FIG. 3 shows an example sequence flow diagram for determining an incident report that includes a root cause analysis of a service incident utilizing an online generative language model according to some implementations. FIG. 3 also includes a series of acts 300 implemented by the anomaly mitigation proposal system 210, the online generative language model 230, and the client device 250.

As shown, the series of acts 300 includes the act 302 of the anomaly mitigation proposal system 210 receiving an incident report request for an incident from the client device 250. For instance, a user subscribes to one or more services of a cloud computing system. When an incident occurs, the user employs the client device 250 to investigate the incident. In some instances, either the anomaly mitigation proposal system 210 and/or a metric management system provides the user with a management interface for investigating incidents and requesting corresponding incident reports.

In various implementations, the user requests an incident report via the client device 250 by indicating an incident time and/or a metrics account. In various instances, the metrics account designates a set of resources, services, and/or monitored metrics that were affected (e.g., the near-real-time production cloud service monitor). The user also indicates an incident time or impact time and/or a time range. For instance, the incident report request specifies an impact time of the past hour, the previous day, or a 10-minute window earlier in the week. In some instances, the user also provides custom notes or hints to better target the incident, such as indicating an affected geographical region (e.g., the western US).

Upon receiving an incident report request, the anomaly mitigation proposal system 210 obtains metric anomalies for the incident. For example, as noted above, the anomaly mitigation proposal system 210 communicates with metric monitoring and/or reporting services to receive anomalous metrics corresponding to the incident. For instance, the monitored metrics system identifies a group or cluster of metrics within the cloud computing system that aligns with the target service, resource, and/or provider. These metrics can include generic metrics, customized metrics, and metrics from a metric datastore account. In some instances, these metrics originate from service telemetry, monitors, and/or alerts within the cloud computing system. In one or more implementations, the metrics correspond to tables or datastores of data for a given service or network application of the cloud computing system.

Additionally, in various instances, the monitored metrics system determines the anomalous metrics. For instance, the monitored metrics system uses a dynamic threshold function or service to process the time series of metric data to determine metric anomalies. In some instances, the metric anomalies include corresponding attributes, characteristics, and/or metadata such as metric names, anomaly directions, dimensions, resource types, sampling types, or anomaly types. Often, a service incident will trigger a substantial number of metric anomalies. Once determined, the monitored metrics system provides the anomalous metrics to the anomaly mitigation proposal system 210. As illustrated in the act 304, the anomaly mitigation proposal system 210 obtains the set of anomalous metrics for the incident. In some instances, rather than only obtaining the anomalous metrics from another system, the anomaly mitigation proposal system 210 receives metrics from monitoring sources and directly determines anomalous metrics from those metrics using, for example, some of the approaches described above.

As shown, the series of acts 300 includes the act 306 of the anomaly mitigation proposal system 210 providing the set of anomalous metrics and a first set of prompts to the online generative language model 230 to generate text narrative responses. For example, the anomaly mitigation proposal system 210 provides the anomalous metrics to the online generative language model 230, such as an online LLM, for processing and analysis.

In many implementations, the first set of prompts directs the online generative language model 230 to generate and provide clear and concise text narratives that deliver an overview summary of the detected anomalies, root causes likely responsible for these anomalies, and remedies to mitigate or address the identified root causes. To rephrase, the first set of prompts includes a summary prompt for the set of anomalous metrics a root cause prompt for the same set of anomalous metrics, and a mitigation prompt for the set of anomalous metrics. The first set of prompts may include additional or different prompts. In some instances, the first set of prompts includes a single prompt with multiple queries. In one or more implementations, providing one or more anomalous metrics to the online generative language model 230 triggers it to automatically process the anomalous metrics accordingly without explicitly providing it an input prompt.

In various implementations, the anomaly mitigation proposal system 210 provides an API that includes the first set of prompts. The anomaly mitigation proposal system 210 may deliver the first set of prompts in a single call to the online generative language model 230 or in separate model calls. For example, the anomaly mitigation proposal system 210 waits to receive and/or validate the response of one prompt before proceeding to the next prompt. The API call or calls could be concealed from or may be hidden from the user's view, signifying that the anomaly mitigation proposal system 210 performs the calls to the online generative language model 230 as a background process.

In many scenarios, the anomaly mitigation proposal system 210 supplies the set of anomalous metrics (or at least grants access to them) to the online generative language model 230 for processing in conjunction with one or more of the prompts. In additional cases, the anomaly mitigation proposal system 210 provides the corresponding attributes, characteristics, and/or metadata of the anomalous metrics such as metric names, anomaly directions, dimensions, resource types, sampling types, or anomaly types to the online generative language model 230 to provide additional context while processing the anomalous metrics.

As mentioned above, the first set of prompts often includes a summary prompt. In various instances, the summary prompt instructs the online generative language model 230 to generate a text narrative response that succinctly summarizes the anomalous metrics. For example, the summary prompt might be as follows: "Summarize the accompanying input data of anomalous metrics and provide a brief overview narrative of the corresponding incident."

As mentioned above, in various implementations, the anomaly mitigation proposal system 210 also includes contextual information about one or more anomalous metrics. For instance, the anomaly mitigation proposal system 210 includes the following format of text as part of the summary prompt, "{anomaly direction} in Metrics on the metric {metric_name} on the resource type {resource_type}." To illustrate, the summary prompt includes:

"spike decrease in Metrics on the metric 'Number of pods in Ready state' on the resource type Cloud.ContainerService/managedClusters," and "spike increase in Metrics on the metric 'CPU usage percentage' on the resource type Cloud.ContainerService/managedClusters."

In the above examples, the anomaly mitigation proposal system 210 requests a summary of anomalous metrics for the managed clusters' resources within the container service of the Cloud System with respect to both the number of pods in the ready state metric and the CPU usage percentage metric.

As mentioned above, the first set of prompts frequently includes a root cause prompt. In many implementations, this root cause prompt directs the online generative language model 230 to determine the root cause and/or potential root causes given the set of anomalous metrics. For example, the root cause prompt may be as follows: "Analyze the input metric anomalies and provide a list of root causes that may have caused these anomalies." Once more, the anomaly mitigation proposal system 210 may provide additional contextual information to the online generative language model 230 to aid in determining potential root causes for the anomalous metrics.

Additionally, as mentioned above, the first set of prompts often includes a mitigation prompt for the given set of anomalous metrics. In many implementations, the mitigation prompt instructs the online generative language model 230 to determine possible mitigation actions for the incident based on the set of anomalous metrics and/or the identified root causes. For example, the mitigation prompt may be phrased as follows: "Given the anomalous metrics, what are some potential mitigation actions for the incident?" or "Given these identified root causes, what are some potential mitigation actions?"

As shown in the act 308 of FIG. 3, the online generative language model 230 processes the first set of prompts to generate text narrative responses. As mentioned above, the generative language model is a large generic and versatile generative model trained on an extensive dataset, capable of producing coherent, fluent, and topic-specific responses. Given the architecture and training of such large generative language models, in many instances, the anomaly mitigation proposal system 210 can effectively utilize them to accurately analyze substantial amounts of metric data, including anomalous metrics, to generate informative insights. As a result, the anomaly mitigation proposal system 210 provides the first set of prompts and the anomalous metrics to the online generative language model 230, enabling the online generative language model 230 to generate text narrative responses. in various implementations, the anomaly mitigation proposal system 210 need not provide explicit prompts to the online generative language model 230, which is trained to provide the appropriate text narrative response.

Once processed, the online generative language model 230 provides the text narrative responses to the anomaly mitigation proposal system 210. As shown in the act 310, the anomaly mitigation proposal system 210 receives the text narrative responses. The act 310 may also include the anomaly mitigation proposal system 210 receiving the text narrative responses before an online model response threshold is satisfied or activated, which is described further below.

In some instances, as mentioned earlier, the anomaly mitigation proposal system 210 provides an initial prompt, such as the summary prompt for the anomalous metrics. In response, the online generative language model 230 produces an initial text response (e.g., an initial text narrative response). For example, given the above example where the anomaly mitigation proposal system 210 seeks a summary within the resources of managed clusters of the container service within the Cloud System including both the number of pods in the ready state metric and the CPU usage percentage metric, the online generative language model 230 may generate and return a text narrative of "There was a brief and sudden decrease in the Number of Pods in the Ready State and an abrupt increase in the CPU usage percentage on the managedClusters resource for Container Service in the Cloud System." Frequently, the online generative language model 230 may determine, generate, and return a short, clear, and concise text narrative explaining the cause of the anomalous metrics.

Additionally, in response to the root cause prompt, the online generative language model 230 may return a text response (e.g., narrative response) explaining why the anomaly occurred and/or a list of potential root causes or incident sources. For example, the online generative language model 230 returns a textual narrative such as: "Insufficient resources might have been allocated to the cluster" and/or "The cluster may have experienced an increased workload." The list of root causes may include: "1) Insufficient resources allocated to the cluster, and 2) Increased workload on the cluster." The online generative language model 230 may produce various text responses.

Similarly, in response to the mitigation prompt, the online generative language model 230 may return a narrative response on how to address one or more of the root causes. For example, the online generative language model 230 could present a text narrative and/or a list of actions for mitigating the increased workload on the cluster (such as scaling up the cluster, optimizing the cluster code, adding nodes, and implementing caching to reduce the load).

In various implementations, the anomaly mitigation proposal system 210 may determine that one or more of the text narrative responses do not meet a certain response parameter. For example, a text narrative response is too lengthy or overly complex (e.g., it violates an input limit, output limit, or other parameter of the online generative language model 230). In such cases, the anomaly mitigation proposal system 210 may direct the online generative language model 230 to provide a new text narrative response or update an existing one to meet the particular response parameter (e.g., "Condense the last response into a single sentence.").

As mentioned above, the act 310 includes receiving the text narrative responses within an online model response threshold (e.g., a response-time threshold or a fallback response threshold). In many instances, the anomaly mitigation proposal system 210 aims to provide an incident report to a requesting user within a specific report generation timeframe (e.g., 30 seconds). Since this report generation timeframe often includes gathering metrics and determining anomalous metrics (e.g., the act 302 and act 304), the anomaly mitigation proposal system 210 establishes a response threshold for interacting with the online generative language model 230 to receive the text narrative responses. The response threshold is shorter than the report generation timeframe as gathering text narrative responses constitutes a part or portion of generating the incident report. For example, the response threshold is 10 seconds. In other scenarios, the response threshold is longer or shorter.

As covered below in connection with FIG. 4, in some instances, the online generative language model 230 is unavailable, inaccessible, or unresponsive, resulting in the failure to provide text narrative responses within the response threshold. However, in the depicted implementation of FIG. 3, the anomaly mitigation proposal system 210 successfully receives the text narrative responses from the online generative language model 230 within the response threshold.

As shown in FIG. 3, the series of acts includes the act 312 of the anomaly mitigation proposal system 210 validating the text narrative responses for accuracy. In various implementations, the anomaly mitigation proposal system 210 ensures that the text narrative responses satisfy one or more accuracy levels before integrating them into an incident report (e.g., the online model response threshold is satisfied, met, or exceeded based on the online generative language model providing inaccurate text responses). As one example, the anomaly mitigation proposal system 210 obtains token confidence scores from the online generative language model 230 regarding an output (e.g., a text narrative response), which determines a confidence score for each token generated in a text response. In such cases, the anomaly mitigation proposal system 210 may determine whether an average or other combined score for the generated tokens (e.g., words) surpasses a minimum confidence threshold (e.g., an output answer has 15 tokens with an average confidence score of 78%, which is higher than a minimum confidence threshold of 70%). If not, the anomaly mitigation proposal system 210 determines that the output is invalid or unreliable.

As another example, the anomaly mitigation proposal system 210 may validate the text narrative responses through follow-up prompts to the online generative language model 230. For example, the anomaly mitigation proposal system 210 prompts the online generative language model 230 whether a given text narrative response is contextually accurate. This approach assists the anomaly mitigation proposal system 210 in ensuring that the online generative language model 230 has not hallucinated or generated fictitious responses.

To illustrate, upon receiving a text narrative response, the anomaly mitigation proposal system 210 may provide the follow-up prompt of "Is this text '{text narrative response output}' representative of the {prompt request type}?" In many cases, these follow-up prompts require a binary (e.g., yes or no) response. For example, the anomaly mitigation proposal system 210 may provide the follow-up prompt, "Does this text 'There was an increased workload on the cluster' describe a possible root cause of the incident? Mandatory answer format: Yes/No." If a follow-up prompt receives a "No" response, the anomaly mitigation proposal system 210 determines that the text narrative response is untrustworthy, invalid, and/or unreliable.

As shown, the act 314 includes the anomaly mitigation proposal system 210 verifying the relevance of the text narrative response. For example, while the text narrative responses may be valid, the anomaly mitigation proposal system 210 may be generating generic responses that are not specific or tailored to a request or service incident. Accordingly, in various implementations, the anomaly mitigation proposal system 210 determines a specificity score for a text narrative response. In various instances, the specificity score is determined by comparing a text narrative response to the particular context of the anomalous metrics (e.g., metric names, cluster names, resource types, sampling type, and breakdown dimensions). If the anomaly mitigation proposal system 210 determines that a text narrative response has a specificity score that does not meet a specificity score threshold, the anomaly mitigation proposal system 210 determines that the text narrative response is invalid or unreliable.

In some implementations, the anomaly mitigation proposal system 210 may use text narrative responses falling within varying unreliable ranges. In such implementations, the anomaly mitigation proposal system 210 provides an indication regarding the confidence level of a text narrative response. For example, the online generative language model 230 indicates that while a root cause could be confidently identified for an incident, it was only able to determine a low-confidence probability that the incident was triggered by "configuration issues," or that a 30% confidence score is attributed to the incident being caused by "configuration issues."

As shown, the act 316 includes the anomaly mitigation proposal system 210 generating an incident report from the text narrative responses that include a summary text response, a root cause text response, and a mitigation text response. In various implementations, the anomaly mitigation proposal system 210 generates an incident report that incorporates one or more of the text narrative responses. For example, the incident report is generated based on a template that includes fields for the text narrative responses. In some implementations, the anomaly mitigation proposal system 210 integrates specific segments or excerpts from the text narrative responses into an incident report.

In various implementations, the anomaly mitigation proposal system 210 also includes visual graphs depicting the anomalous metrics alongside the text narrative responses. This approach ensures that the text narrative responses within the incident report provide clear and concise information regarding the anomalous metrics, thereby enhancing the value of the visual graphs of the anomalous metrics.

As shown, the act 318 includes the anomaly mitigation proposal system 210 providing the incident report to the client device 250 in response to the incident report request. Following the creation of the incident report, the anomaly mitigation proposal system 210 sends it to the client device 250, providing a summary text response, a root cause text response, and a mitigation text response along with other information about the incident. In certain instances, the incident report includes supplementary or different information based on the text narrative responses generated by the online generative language model 230.

As mentioned above, in various implementations, the anomaly mitigation proposal system 210 provides the incident report to the client device 250 in response to an incident report request. In some implementations, the anomaly mitigation proposal system 210 sends an incident report in response to the metric management system detecting anomalous metrics. For example, when the metric management system detects an incident, the anomaly mitigation proposal system 210 provides the client device 250 with an incident report that includes the text narrative responses as discussed above. In these instances, the anomaly mitigation proposal system 210 may omit the action of requiring the online generative language model 230 to respond within a response threshold or extend the response threshold if the model is initially unavailable.

While FIG. 3 shows the anomaly mitigation proposal system 210 utilizing the online generative language model 230 to generate an incident report, in some instances, the online generative language model 230 is unavailable or unreliable. This concept is further covered in connection with FIG. 4. In particular, FIG. 4 shows an example sequence flow diagram of determining an incident report that includes a root cause analysis of a service incident utilizing a fallback model and a root cause datastore.

As shown, FIG. 4 includes the same components as FIG. 3. FIG. 4 also includes a series of acts 400 performed by the anomaly mitigation proposal system 210, the online generative language model 230, the fallback model 240, and the client device 250.

As shown, the series of acts 400 includes the acts 302-306 as described above. For example, the anomaly mitigation proposal system 210 receives an incident report from the client device 250 (e.g., the act 302), identifies a set of anomalous metrics (e.g., the act 304), and provides the anomalous metrics and first set of prompts to the online generative language model 230 (e.g., the act 306).

The series of acts 400 also includes the act 408 of the online generative language model 230 failing to process the first set of prompts. In particular, the online generative language model 230 fails to process and return text responses (e.g., text narrative responses) before an online model response threshold (or "response threshold") is satisfied. To illustrate, the act 410 of shows the anomaly mitigation proposal system 210 determining that the text narrative responses were not received before the response threshold was satisfied or met. In some instances, the response threshold is a timer that elapses before the online generative language model 230 provides text narrative responses to the first set of prompts.

There may be reasons for the online generative language model 230 to be unavailable or unresponsive. For example, the online generative language model 230 is unavailable due to throttling (e.g., too many calls), network congestion, timeouts, a planned service outage, a token limit overload, or resource overload. In some implementations, the online generative language model 230 returns an error instead of providing text narrative responses, which satisfies the response threshold (e.g., a fallback response threshold that is activated when error messages are received). In some instances, the online generative language model 230 is available but unresponsive or incapable of completing the entire request within the response threshold and/or before the response threshold is satisfied. For example, the online generative language model 230 provides a response to the summary prompt but is unable to provide additional text narrative responses before the response threshold elapses.

In various implementations, the online generative language model 230 provides a text narrative response that the anomaly mitigation proposal system 210 determines as invalid or incorrect. For example, a text narrative response fails validation or verification, as previously described. In these implementations, the anomaly mitigation proposal system 210 triggers the fallback model 240. In many instances, the prompts or inputs are provided and/or checked sequentially for validity.

Due to the failure of the online generative language model 230 (or in instances where the anomaly mitigation proposal system 210 determines to skip using the online generative language model 230), the anomaly mitigation proposal system 210 relies on a fallback approach for generating text narrative responses. As previously mentioned, the fallback approach includes utilizing the fallback model 240 when the online generative language model 230 is unavailable. As shown, the series of acts 400 includes the act 412 of the anomaly mitigation proposal system 210 providing the set of anomalous metrics and a set of queries to the offline generative language model 242 to generate text responses. In various implementations, the set of queries seeks the same information as the first set of prompts. For example, the set of queries includes requests, searches, and/or calls to the root cause datastores to identify metrics from the set of anomalous metrics.

As previously mentioned, the fallback model 240 has access to one or more root cause datastores, including those generated and/or updated by the offline generative language model. Commonly, because of the large number of root causes and anomaly metric combinations, there may be a significant number of root causes and each datastore itself can include a significant number of entries mapping a root cause to potential anomalous metrics and combinations of anomalous metrics. As a result of the large number and scale of the root cause datastores, the fallback model 240 often provides a more detailed analysis although it might take more time to determine a root cause, mitigative actions, and/or provide text narrative responses.

As shown, the act 414 includes the fallback model 240 processing the set of queries using a root cause datastore to generate one or more of the text responses. For example, one or more queries in the set of queries are directed toward the root cause prompt and instructs the fallback model 240 to utilize a root cause datastore to identify potential root causes for the anomalous metrics based on metric names and/or other metric characteristics.

Figure 5:
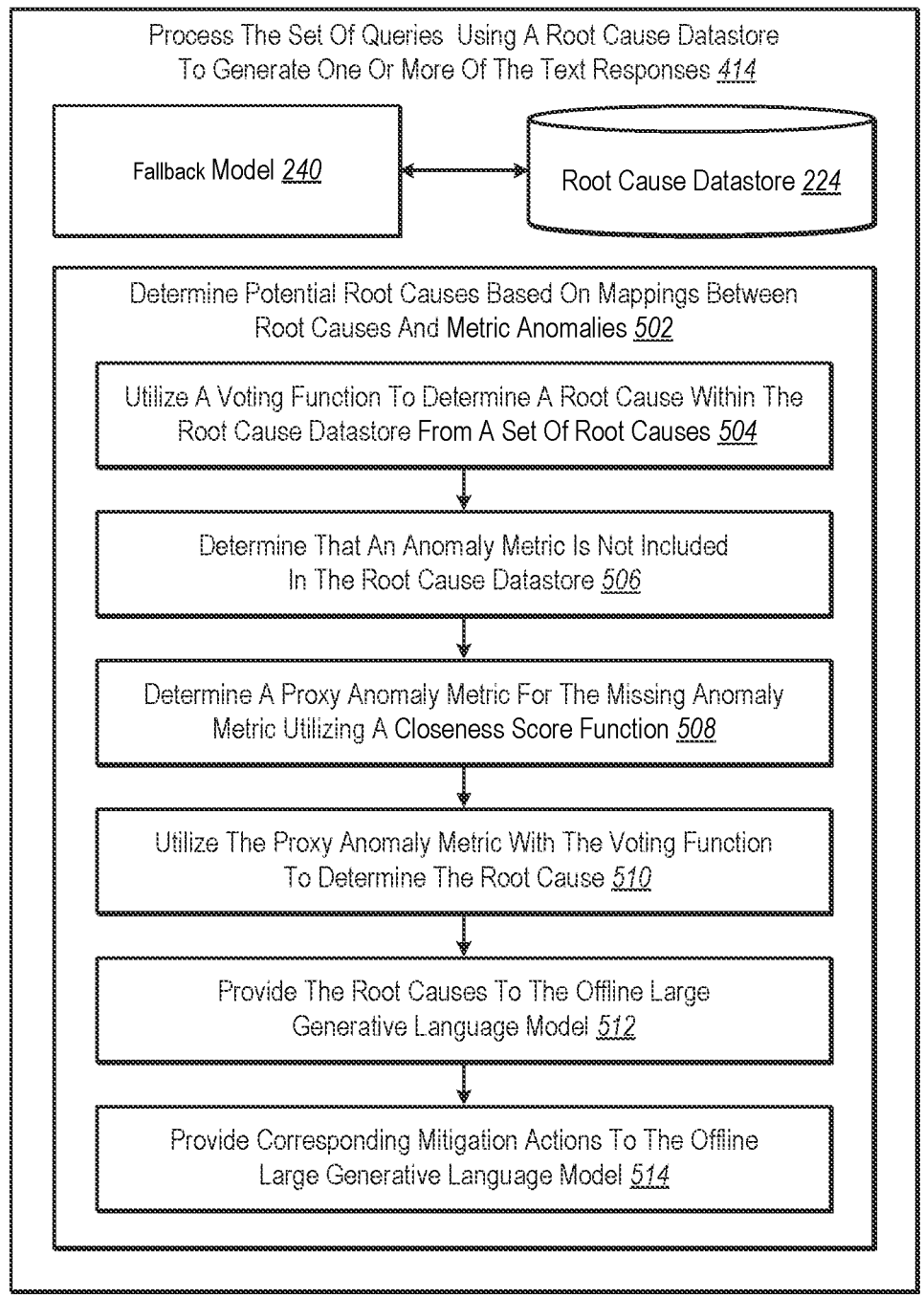
FIG. 5 illustrates an example process flow for determining a root cause of a set of anomalous metrics utilizing the fallback model and the root cause datastore.
Figure 6:
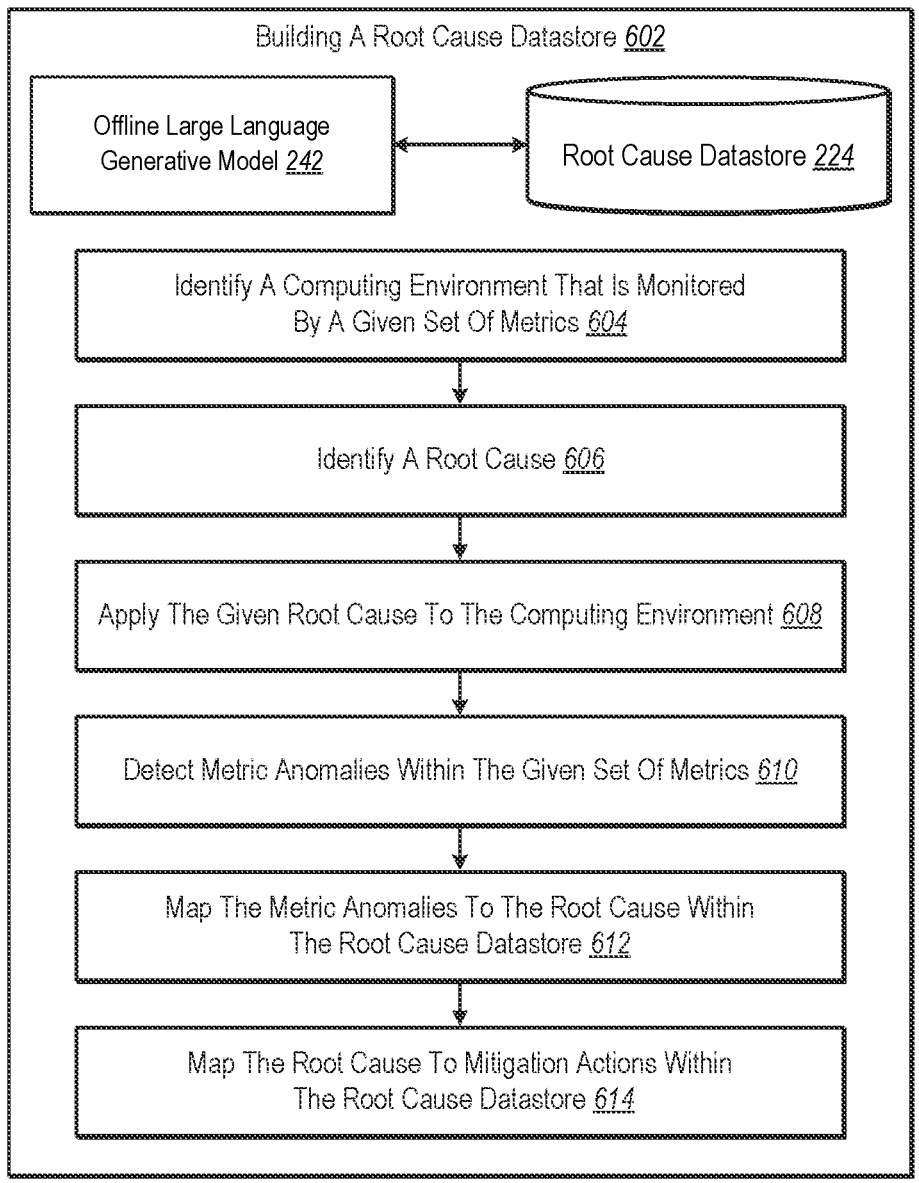
FIG. 6 illustrates an example process flow for generating a root cause datastore utilizing a fallback model.

The fallback model 240 may identify multiple candidate entries from the one or more root cause datastores that match one or more metrics from the set of anomalous metrics. In these cases, the fallback model 240 may determine to select a particular root entry or combination of entries from a set of entries that include matching metrics to the set of anomalous metrics, which is further described in connection with FIG. 5. In particular, FIG. 5 below provides additional details regarding accessing root cause information from a root cause datastore including using voting functions, closeness scores, and expert domain knowledge. FIG. 6 below provides additional detail regarding generating and/or updating root cause datastores.

Upon identifying one or more relevant entries within a root cause datastore (e.g., root cause database) for the set of anomalous metrics, the fallback model 240 identifies the mapping indicating a root cause and/or mitigation actions. Using the text information in these entries corresponding to the root cause, the fallback model 240 can provide text responses corresponding to a summary prompt, a root cause prompt, and/or a mitigation prompt for the set of anomalous metrics. In some instances, because the root cause datastore and its entries were created by an offline generative language model, the text information within the entries is in a text narrative form. In various implementations, if an entry and its mapping are not in a text narrative form, a generative language model or other model converts the information from the entry and its mapping into text narrative responses.

In some instances, the root cause prompt, and/or the mitigation prompt for the set of anomalous metrics are associated with a template and the fallback model 240 utilizes the information from the identified entries in the root cause datastore to populate the template to provide a summary text response, a root cause text response, and/or a mitigation text response. Additionally, if the anomaly mitigation proposal system 210 receives a text narrative response to a summary prompt from the online generative language model 230, then the anomaly mitigation proposal system 210 may omit requesting the summary prompt via the fallback model 240 within the set of queries.

In some implementations, the fallback model 240 utilizes a generative language model to access entries and mappings in a root cause datastore. In one or more implementations, the fallback model 240 utilizes another type of model to access the root cause mapping data from the root cause datastore. For example, the anomaly mitigation proposal system 210 uses a mapping and/or clustering model that accesses the root cause mapping data and determines scores results from the root cause datastore to determine potential root causes for the anomalous metrics.

In some implementations, the fallback model 240 also determines mitigation actions from the root cause datastore. For example, the root cause datastore also maps mitigation actions to root causes. Accordingly, when a root cause is determined for the anomalous metrics, the root cause datastore also provides corresponding mitigation actions.

As shown, the act 416 includes the anomaly mitigation proposal system 210 receiving the text responses (e.g., text narrative responses). For example, the fallback model 240 provides text narrative responses for the set of queries to the anomaly mitigation proposal system 210.

In response, the anomaly mitigation proposal system 210 generates the incident report from the text narrative responses, as shown in the act 418. In many implementations, the anomaly mitigation proposal system 210 utilizes one or more text narrative responses from the fallback model 240. In various implementations, the anomaly mitigation proposal system 210 generates an incident report that includes a summary text response, a root cause text response, and a mitigation text response based on the text response received from the fallback model 240. In some cases, the anomaly mitigation proposal system 210 also includes one or more text narrative responses from the online generative language model 230 before it became unavailable or unreliable.

Further, as shown in the act 318 and as described above, the anomaly mitigation proposal system 210 provides the incident report to the client device 250 in response to the incident report request.

As mentioned above, in various implementations, when available, the online generative language model 230 generates root causes for the anomalous metrics. In some implementations, the anomaly mitigation proposal system 210 requests the online generative language model 230 to provide a list of potential root causes for the set of anomalies. In these instances, the anomaly mitigation proposal system 210 may then directly or indirectly access the root cause datastore to score, evaluate, rank, verify, and/or select one or more root causes from the list of potential root causes to enhance the accuracy of the incident report. For example, the anomaly mitigation proposal system 210 compares each root cause in the list with mappings in the root cause datastore to determine which root causes best map to the set of anomalous metrics.

As mentioned above, FIG. 5 provides additional details regarding accessing root cause information from a root cause datastore including using voting functions, closeness score functions, and expert domain knowledge. To illustrate, FIG. 5 shows an example process flow for determining a root cause of a set of anomalous metrics utilizing the fallback model and the root cause datastore. In particular, FIG. 5 shows an expanded example of the act 414 from FIG. 4 of processing the set of queries using a root cause datastore (e.g., root cause database) to generate one or more of the text responses.

As shown, FIG. 5 includes interactions between the fallback model 240 and the root cause datastore 224 to determine root causes. In some implementations, the anomaly mitigation proposal system 210 is performing actions with respect to the root cause datastore 224, such as accessing entries and mappings. In various implementations, the anomaly mitigation proposal system 210 allows the fallback model 240 or another service to access and/or update the root cause datastore 224.

FIG. 5 includes an act 502 of determining potential root causes based on mappings between root causes and metric anomalies. For example, the anomaly mitigation proposal system 210 identifies and provides mappings to the fallback model 240, which uses the information to determine the potential root causes.

As a note, while a single root cause datastore is shown, the root cause datastore 224 may represent multiple root cause databases, tables, blobs, and/or other types of datastores that include mappings between root causes and anomalous metrics. Mappings across one or more root cause datastores may be extensive and substantial to accommodate the large (e.g., exponential) number of metrics and metric combinations within the cloud computing system. In some instances, each root cause category is associated with its own root cause datastore or table.

The act 502 includes various sub-acts. As shown, the sub-act 504 includes utilizing a voting function to determine a root cause from a set of root causes within the root cause datastore. In various instances, the voting function matches combinations of metrics to potential root causes (e.g., sources) based on the number of metrics per root cause. The anomaly mitigation proposal system 210 may check some or all of the entries in one or more root cause datastores to determine votes for each metric anomaly and/or combination of anomalous metrics.

As a simple example, consider a root cause datastore that includes the following mapping:
  1) Root Cause A: Metric 1, Metric 2, Metric 4
  2) Root Cause B: Metric 2, Metric 4, Metric 5, Metric 7
  3) Root Cause C: Metric 1, Metric 6, Metric 8, Metric 9
If the set of anomalous metrics includes Metric 1, Metric 4, Metric 6, and Metric 8, then the anomaly mitigation proposal system 210 determines the following votes for the root causes: Root Cause A—2 votes, Root Cause B—1 vote, Root Cause C—3 votes. In various instances, the anomaly mitigation proposal system 210 may provide Root Cause A as the dominant cluster to the fallback model 240. In some implementations, the anomaly mitigation proposal system 210 also provides Root Cause A to the fallback model 240 with a smaller weight or confidence level. In various instances, the anomaly mitigation proposal system 210 provides a ranked list of root causes and/or root causes that meet a threshold voting function score.

As shown, the sub-act 506 includes determining that an anomaly metric is not included in the root cause datastore. For example, the set of anomalous metrics includes Metric 10, which is not part of any of the above mappings. In these implementations, the anomaly mitigation proposal system 210 may utilize a closeness score function for the missing metric.

To illustrate, the sub-act 508 includes determining a proxy anomaly metric for (e.g., to substitute for) the missing anomaly metric using a closeness score or similarity function. For example, the anomaly mitigation proposal system 210 determines a closeness score between the missing anomaly metric and other anomalous metrics included in the mappings of the root cause datastore. In some implementations, the anomaly mitigation proposal system 210 determines a closeness score by comparing similarities between metadata, attributes, and/or characteristics of metrics (e.g., comparing metric names, anomaly timing, reporting sources, and what each metric is measuring). The anomaly mitigation proposal system 210 can then use the closest metric as a proxy anomaly metric as a substitute for the missing anomaly metric. In some instances, the anomaly mitigation proposal system 210 calculates a closeness score between one or more metrics in the set of anomalous metrics and common or typical anomalous scenarios having similar anomalous metrics.

As shown, the sub-act 510 includes utilizing the proxy anomaly metric with the voting function, as described above in the sub-act 504) to determine the root cause. Upon updating the set of anomalous metrics with proxy anomalous metrics and/or using the anomalous metrics of closely related typical anomalous scenarios, the anomaly mitigation proposal system 210 re-applies the voting function to determine root causes from the mappings. For instance, if the proxy anomaly metric for Metric 10 was Metric 9, then the voting function would indicate that Root Cause C has 4 votes.

Additionally, as shown, the sub-act 512 includes providing the root causes to the fallback model 240. For example, the anomaly mitigation proposal system 210 provides one or more of the root causes from the root cause datastore to the fallback model 240 for processing. Further, as shown, the sub-act 514 includes providing corresponding mitigation actions from the root cause datastore 224 to the fallback model 240, as previously described.

In various implementations, the fallback model 240 utilizes user input, such as expert domain knowledge, to determine root causes for a set of anomalous metrics. For example, in some instances, as part of processing the root cause mappings, a domain expert may provide input to enhance the determination process. This input is minimal and may include directing the fallback model 240 to a new or unused root cause datastore that may have been overlooked. Another form of input includes suggesting a root cause and/or mitigation steps for the set of anomalous metrics. Further, the input may entail requesting the generation of additional mappings within a root cause datastore, as described below.

As mentioned above, FIG. 6 provides additional detail regarding generating and/or updating root cause datastores (e.g., root cause databases). In particular, FIG. 6 illustrates one example process flow for generating a root cause datastore utilizing a fallback model according to some implementations.

As shown, FIG. 6 includes the act 602 of the anomaly mitigation proposal system 210 building a root cause datastore (e.g., the root cause datastore 224) through a series of acts. In some implementations, the anomaly mitigation proposal system 210 utilizes the offline generative language model 242 and/or another model to generate mappings or provide other information within the mappings of the root cause datastore 224.

In various implementations, even with the voting function and the closeness score function, the anomaly mitigation proposal system 210 is unable to identify relevant mappings within the root cause datastore 224 for one or more metrics in a set of anomalous metrics. Accordingly, in some instances, the anomaly mitigation proposal system 210 generates mappings to append, modify, and/or edit entries in the root cause datastore. In various implementations, the anomaly mitigation proposal system 210 utilizes a reverse engineering type of process to discover mappings to add between root causes and anomalous metrics, which is described next.

To illustrate, the act 604 includes the anomaly mitigation proposal system 210 identifying a computing environment that is monitored by a given set of metrics. For example, when given a set of anomalous metrics for which no current mapping can be determined within the root cause datastore, the anomaly mitigation proposal system 210 simulates and/or recreates the computing environment that corresponds to the set of anomalous metrics. The computing environment may include service monitors for measuring the metrics from the set of anomalous metrics.

As shown, the act 606 includes identifying a root cause or multiple root causes. These include problem sources that may arise within the computing environment. Next, the anomaly mitigation proposal system 210 applies the given root cause to the computing environment. For example, the anomaly mitigation proposal system 210 applies stress to the computing environment, as shown in act 608. For instance, the anomaly mitigation proposal system 210 allocates additional workloads to a cluster or removes resources from the cluster.

These stresses may then trigger the root cause to create a metric anomaly within the set of anomalous metrics, which the anomaly mitigation proposal system 210 detects and measures, as shown in act 610. The anomaly mitigation proposal system 210 may repeat this process for each possible root cause. Similarly, the anomaly mitigation proposal system 210 may apply different stresses and issues to the computing environment to trigger various metric anomalies within the set of metric anomalies.

Once a metric anomaly is detected, the anomaly mitigation proposal system 210 may correlate the root cause with the metric anomaly. In particular, the anomaly mitigation proposal system 210 maps the metric anomalies to the root cause within the root cause datastore, as shown in the act 612.

In some implementations, the anomaly mitigation proposal system 210 also maps the root cause to mitigation actions within the root cause datastore, as shown in the act 614. For example, the anomaly mitigation proposal system 210 may add the counteraction of the stressed action as a mitigating action for the mapping between the root cause and the corresponding metric anomalies (e.g., which metrics become anomalous in each scenario). For instance, if the computing environment was stressed by overloading a CPU with additional tasks to trigger a particular root cause, the anomaly mitigation proposal system 210 adds the mitigation action of reducing the CPU load to mitigate the particular root cause when the same corresponding metric anomalies are detected.

In another example process, the anomaly mitigation proposal system 210 generates a root cause datastore or entries within a root cause datastore similar to the process provided above of sending a set of anomalous metrics and a corresponding set of prompts to an online generative language model (e.g., a summary prompt, a root cause prompt, and a mitigation prompt). Here, however, the anomaly mitigation proposal system 210 is not constrained by needing to quickly provide a response. Rather, the anomaly mitigation proposal system 210 can send the set of anomalous metrics and the set of prompts (e.g., a second set of prompts) to the offline generative language model 242, which is available and responsive to receive text narrative responses because it does not face the same quality-of-service timeliness constraints as the online generative language model.

In various implementations, the offline generative language model 242 takes longer to process the prompts and determine text narrative responses and answers to the prompts. The anomaly mitigation proposal system 210 then stores these text narrative responses as entries in the root cause datastore 224 that map the set of anomalous metrics to the root cause identified by the offline generative language model 242. Additionally, in some implementations, as mentioned above, a domain expert can review the root cause datastores to enhance and/or correct them. For example, the domain expert suggests a mapping to an entry that may have been missed by the offline generative language model 242.

Figure 7:
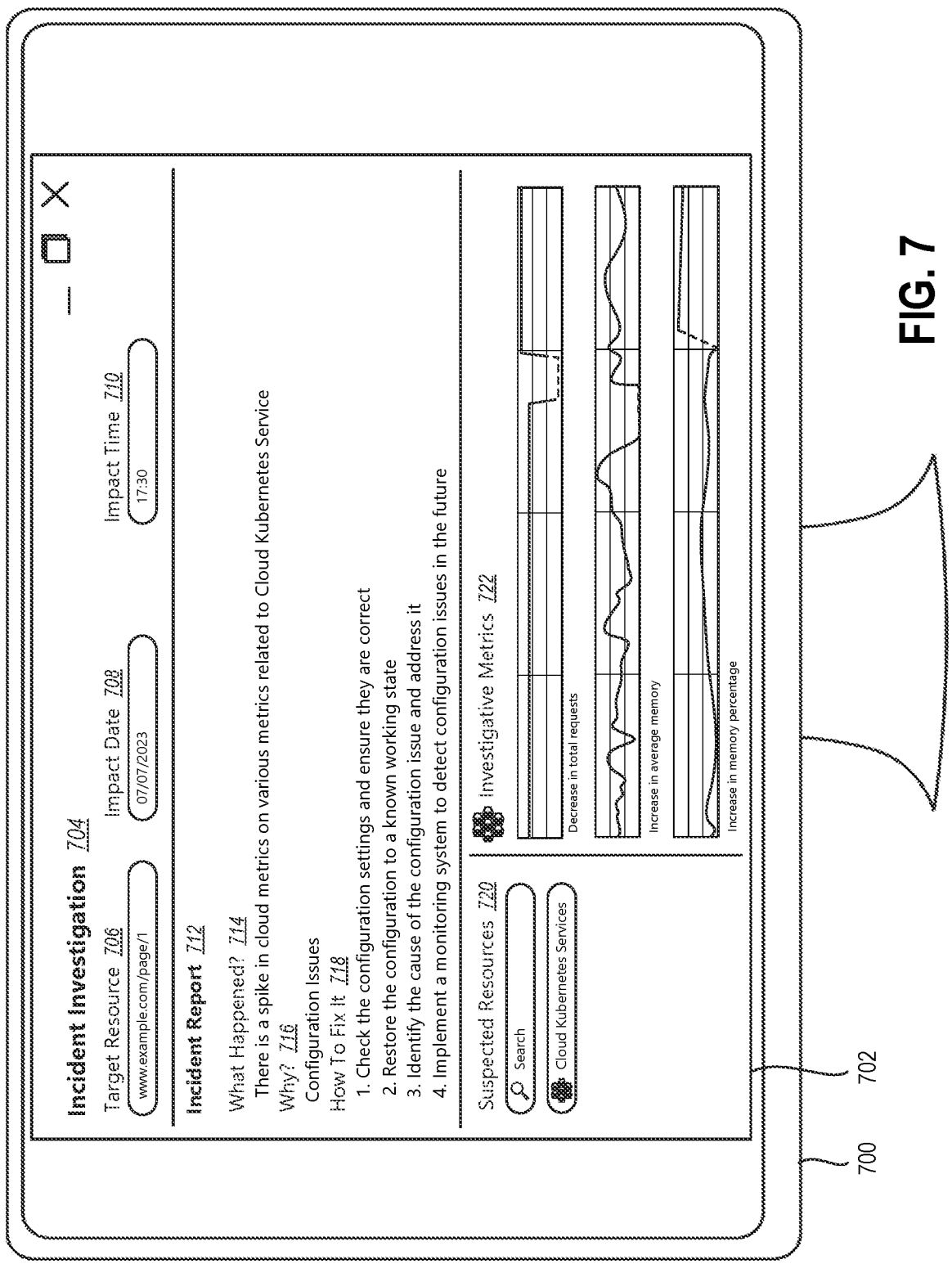
FIG. 7 illustrates an example graphical user interface for displaying an incident report of a service incident.

FIG. 7 illustrates an example graphical user interface for displaying an incident report of a service incident according to some implementations. As shown, FIG. 7 includes a computing device 700 having a display showing a graphical user interface 702. For example, the graphical user interface 702 is displayed as part of a client application that allows access to functions of the anomaly mitigation proposal system 210 (e.g., via a metric management system).

As shown, the graphical user interface 702 includes an incident investigation interactive interface 704 where a user can submit a request for an incident report. To illustrate, the incident investigation interactive interface 704 includes input fields for a target resource 706, an impact date 708, and an impact time 710. The incident investigation interactive interface 704 may include additional or different input fields. Additionally, in some cases, the incident report request is made via a different interactive interface.

Using the inputs in the incident investigation interactive interface 704, the anomaly mitigation proposal system 210 utilizes an online generative language model and/or a fallback model to generate an incident report that includes text narrative responses, as described in this disclosure. The anomaly mitigation proposal system 210 then provides the incident report to the user in response to the incident report request.

To illustrate, the graphical user interface 702 includes an incident report 712. As shown, the incident report 712 includes a summary text response 714, a root cause text response 716, and a mitigation text response 718. The summary text response 714 (e.g., "What happened?") provides a short text narrative that summarizes the anomalous metrics in plain language for the user. The root cause text response 716 (e.g., "Why?") provides a text narrative or list of root causes and/or sources of the anomalous metrics. The mitigation text response 718 (e.g., "How to fix it.") provides mitigation actions for addressing the anomalous metrics and/or preventing the issue in the future. The incident report 712 may include additional or different text narrative responses.

In addition, the incident report 712 includes a list of suspected resources 720 and incident metric graphs 722. As shown, the incident metric graphs 722 include time series graphs for metrics within the set of anomalous metrics. Depending on the number of anomalous metrics, the incident metric graphs 722 may include a large number of graphs visually indicating anomalies. As mentioned above, because the incident metric graphs 722, especially in aggregate, may be difficult to understand, the anomaly mitigation proposal system 210 provides the text narrative responses to deliver clear and concise information about the incident, corresponding anomalous metrics, root causes, and mitigation actions.

Figure 8:
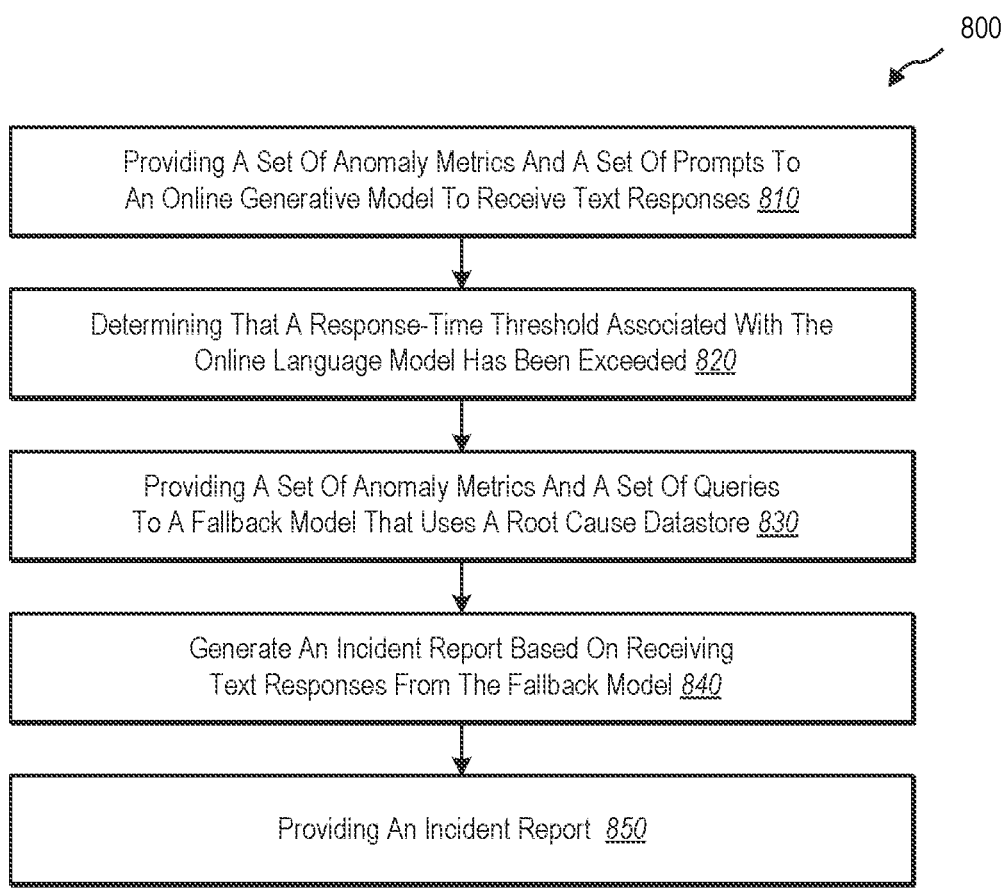
FIG. 8 illustrates an example series of acts of a computer-implemented method for reporting anomalous metrics in a cloud computing system.

Turning now to FIG. 8, this figure illustrates an example flowchart that includes a series of acts 800 for utilizing the anomaly mitigation proposal system in accordance with one or more implementations. In particular, FIG. 8 illustrates an example series of acts for reporting anomalous metrics in a cloud computing system according to some implementations.

While FIG. 8 illustrates acts according to one or more implementations, alternative implementations may omit, add to, reorder, and/or modify any of the acts shown. Furthermore, the acts of FIG. 8 can be performed as part of a method (e.g., a computer-implemented method). Alternatively, a computer-readable medium can include instructions that, when executed by a processing system having a processor, cause a computing device to perform the acts of FIG. 8.

In some implementations, a system (e.g., a processing system comprising a processor) can perform the acts of FIG. 8. For example, the acts include a system for reporting anomalous metrics in a cloud computing system. In some instances, the system includes a processing system and a computer memory including instructions that, when executed by the processing system, cause the system to perform various actions or steps. In various implementations, the system includes a set of anomalous metrics; a first set of prompts including a summary prompt, a root cause prompt, and a mitigation prompt; a root cause datastore that maps root causes to anomalous metrics; and a fallback model that utilizes the root cause datastore to determine root causes for sets of anomalous metrics.

As shown, the series of acts 800 includes an act 810 of providing a set of anomalous metrics to an online generative model to receive text responses. For instance, in example implementations, the act 810 involves providing a first input including a set of anomalous metrics to an online generative language model to generate text responses (e.g., text narrative responses) in response to receiving an incident report request. In various implementations, the first input includes a first set of prompts. In one or more implementations, the first set of prompts includes a summary prompt for the set of anomalous metrics, a root cause prompt for the set of anomalous metrics, and a mitigation prompt for the set of anomalous metrics. In various instances, the prompt is a single prompt that includes a summary query, a root cause query, and a mitigation query. In some implementations, the first set of prompts is provided as part of an application programming interface (API) hidden from a user submitting the incident report request.

In various implementations, the act 810 includes providing the online generative language model with additional context for the set of anomalous metrics including metric names, anomaly directions, dimensions, resource types, sampling types, and anomaly types. In certain implementations, the incident report request includes a metrics account and an incident time corresponding to one or more cloud computing system services.

In some implementations, the act 810 includes providing an additional set of anomalous metrics and the first set of prompts to the online generative language model to receive text narrative responses in response to receiving an additional incident report request, receiving the text narrative responses from the online generative language model within the online model response threshold, and providing an additional incident report having the text narrative responses in response to the additional incident report request.

As further shown, the series of acts 800 includes an act 820 of determining that a response threshold associated with the online language model has been satisfied. For instance, in example implementations, the act 820 involves determining that an online model response threshold associated with the online generative language model has been satisfied without receiving the text narrative responses. In some implementations, the act 820 includes determining that a fallback response threshold is activated.

In various implementations, the act 820 includes identifying a set of metrics corresponding to the incident report request based on the metrics account and an incident time and determining the set of anomalous metrics from the set of metrics. In one or more implementations, the online model response threshold is satisfied, met, or exceeded based on the online generative language model providing inaccurate text responses to one or more of the first set of prompts. In various implementations, the act 820 also includes determining that the online generative language model provides an inaccurate text response to the first input by validating the text narrative responses with follow-up prompts to the online generative language model that include portions of the additional text narrative responses before providing the additional incident report.

In various implementations, the online model response threshold is an online model response-time threshold. In one or more implementations, the online model response threshold is a timer-based threshold that is satisfied when the text responses are not received before a timer expires. In some cases, the online model response-time threshold is about 10 seconds. In some implementations, the online model response threshold is a fallback response threshold that is activated when the online generative language model is determined to be unresponsive, unavailable, or it does not return text responses within a predetermined time.

As further shown, the series of acts 800 includes an act 830 of providing the set of anomalous metrics and a set of queries to a fallback model that uses a root cause datastore. For instance, in example implementations, the act 830 involves providing the set of anomalous metrics and a set of queries to a fallback model for one or more of the text narrative responses, the fallback model utilizing a root cause datastore to determine a root cause for the set of anomalous metrics based on determining that the online model response threshold has been satisfied. In some implementations, the act 830 includes providing the set of anomalous metrics to the fallback model with or without the set of queries or prompts. In some implementations, the fallback model includes an offline generative language model.

In various implementations, the act 830 includes providing a set of anomalous metrics and a set of prompts to a fallback model for text narrative responses. In some implementations, the act 830 includes determining, utilizing the fallback model a root cause for the set of anomalous metrics based on analyzing mappings within a root cause datastore. In one or more implementations, the root cause datastore includes mappings between a root cause and metric anomalies that correspond to the root cause. In some instances, the root cause datastore further maps the root cause to one or more mitigation actions for mitigating the root cause.

In one or more implementations, the act 830 includes determining a root cause within the root cause datastore from a set of root causes utilizing a voting function. In some instances, the act 830 includes determining that an anomaly metric is not included in the root cause datastore, determining a proxy anomaly metric to substitute for the anomaly metric utilizing a closeness score function, and utilizing the proxy anomaly metric in the voting function to determine the root cause. In various instances, the act 830 includes generating an additional root cause datastore and/or updating the root cause datastore by simulating an additional root cause condition, determining one or more anomalous metrics that result due to simulating the additional root cause condition, and generating a mapping between the additional root cause condition and the one or more anomalous metrics. In some instances, the act 830 includes generating an additional root cause datastore and/or updating the root cause datastore by utilizing an offline generative language model and a second set of queries corresponding to the set of anomalous metrics to create mappings between anomalous metrics and root causes.

As further shown, the series of acts 800 includes an act 840 of generating an incident report based on receiving text responses from the fallback model. For instance, in example implementations, the act 840 involves generating, based on receiving text responses from the fallback model, an incident report from the text responses, where the incident report includes a summary text response, a root cause text response, and a mitigation text response.

As further shown, the series of acts 800 includes an act 850 of providing an incident report. For instance, in example implementations, the act 850 involves responding to the incident report request with the incident report, which includes the summary text response, the root cause text response, and the mitigation text response. In various implementations, the act 850 includes responding to the incident report request by providing the incident report to the computing device.

In one or more implementations, the incident report includes a summary text response of the set of anomalous metrics, a root cause text response indicating the root cause, and a mitigation text response indicating a mitigation action for the root cause. In various instances, the incident report includes time series graphs for metrics within the set of anomalous metrics. In some implementations, the incident report is provided to a client device for display, for example, to a user.

In some instances, the act 850 includes providing the set of anomalous metrics and a first set of prompts to an online generative language model to receive the text narrative responses before providing the set of anomalous metrics to the fallback model in response to receiving an incident report request and determining that an online model response threshold associated with the online generative language model has been satisfied before receiving the text narrative responses from the online generative language model.

In some implementations, the series of acts 800 includes an alternative set of actions where the fallback model is used without calling or using the online generative model. For example, in some implementations, the series of acts 800 includes providing a set of anomalous metrics and a set of queries to a fallback model; determining, utilizing the fallback model, a root cause for the set of anomalous metrics based on analyzing mappings within a root cause datastore; receiving text responses from the fallback model; and delivering, in response to an incident report request, an incident report having the text responses, which includes a summary text response of the set of anomalous metrics, a root cause text response indicating the root cause, and a mitigation text response indicating a mitigation action for the root cause.

Figure 9:
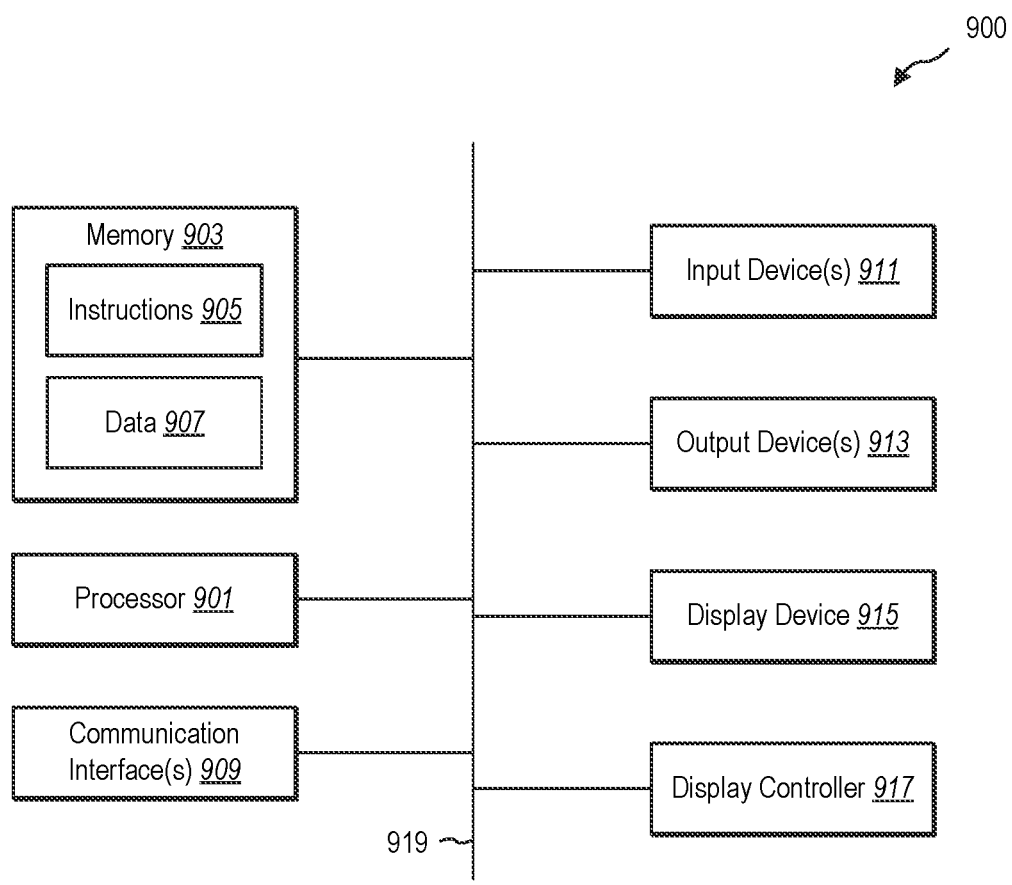
FIG. 9 illustrates example components included within a computer system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for reporting anomalous metrics in a cloud computing system, the computer-implemented method comprising:
   in response to receiving an incident report request, providing a first input including a set of anomalous metrics to an online generative language model;
   determining that an online model response threshold associated with the online generative language model has been satisfied;
   based on determining that the online model response threshold has been satisfied, providing the set of anomalous metrics and a set of queries to a fallback model, the fallback model utilizing a root cause datastore to determine a root cause for the set of anomalous metrics;
   based on receiving text responses from the fallback model, generating an incident report that includes a summary text response, a root cause text response, and a mitigation text response; and
   responding to the incident report request with the incident report.

2. The computer-implemented method of claim 1, wherein the root cause datastore includes mappings between a root cause and metric anomalies that correspond to the root cause.

3. The computer-implemented method of claim 2, wherein the root cause datastore further maps the root cause to a mitigation action for mitigating the root cause.

4. The computer-implemented method of claim 1, wherein the first input includes a first set of prompts, a summary prompt for the set of anomalous metrics, a root cause prompt for the set of anomalous metrics, and a mitigation prompt for the set of anomalous metrics.

5. The computer-implemented method of claim 1, further comprising determining the root cause from a set of root causes within the root cause datastore utilizing a voting function.

6. The computer-implemented method of claim 5, further comprising:
   determining that an anomaly metric is not included in the root cause datastore;
   determining a proxy anomaly metric to substitute for the anomaly metric utilizing a closeness score function; and
   utilizing the proxy anomaly metric in the voting function to determine the root cause.

7. The computer-implemented method of claim 1, wherein the incident report request includes a metrics account and an incident time corresponding to a cloud computing system service.

8. The computer-implemented method of claim 7, further comprising:
   identifying a set of metrics corresponding to the incident report request based on the metrics account and the incident time; and
   determining the set of anomalous metrics from the set of metrics.

9. The computer-implemented method of claim 1, further comprising generating an additional root cause datastore by utilizing an offline generative language model and a second set of queries corresponding to the set of anomalous metrics to create mappings between anomalous metrics and root causes.

10. The computer-implemented method of claim 1, further comprising updating the root cause datastore by:
   simulating an additional root cause condition;
   determining an anomalous metric that result due to simulating the additional root cause condition; and
   generating a mapping between the additional root cause condition and the anomalous metric.

11. The computer-implemented method of claim 1, wherein the online model response threshold is satisfied when the online generative language model provides an inaccurate text response to the first input.

12. The computer-implemented method of claim 1, further comprising:
   in response to receiving an additional incident report request, providing an additional set of anomalous metrics and the first input to the online generative language model to receive text narrative responses;
   receiving the text narrative responses from the online generative language model before the online model response threshold is satisfied; and
   providing an additional incident report having the text narrative responses in response to the additional incident report request.

13. The computer-implemented method of claim 12, further comprising determining that the online generative language model provides an inaccurate text response to the first input by validating the text responses with a follow-up prompt to the online generative language model that includes portions of the text responses before providing the additional incident report.

14. The computer-implemented method of claim 1, wherein the online model response threshold is a timer-based threshold that is satisfied when the text responses are not received before a timer expires.

15. A system for reporting anomalous metrics in a cloud computing system, the system comprising:
   a processing system having a processor; and
   a computer memory including:
      a set of anomalous metrics;
      a first input including a summary query, a root cause query, and a mitigation query;
      a root cause datastore that maps root causes to anomalous metrics;
      a fallback model that utilizes the root cause datastore to determine root causes for sets of anomalous metrics; and
      instructions that, when executed by the processing system, cause the system to carry out operations comprising:
         in response to receiving an incident report request from a computing device, providing the set of anomalous metrics and the first input to an online generative language model;
         based on a fallback response threshold being activated, providing the set of anomalous metrics to the fallback model;
         based on receiving text responses from the fallback model, generating an incident report that includes a summary text response, a root cause text response, and a mitigation text response; and
         responding to the incident report request by providing the incident report to the computing device.

16. The system of claim 15, wherein the operations further comprise providing the online generative language model with additional context for the set of anomalous metrics including metric names, anomaly directions, dimensions, resource types, sampling types, and anomaly types.

17. The system of claim 15, wherein the first input includes a first set of prompts that is provided as part of an application programming interface (API).

18. The system of claim 15, wherein the incident report includes:
   time series graphs for metrics within the set of anomalous metrics; or
   the summary text response of a set of anomalous metrics, the root cause text response indicating a root cause, and the mitigation text response indicating a mitigation action for the root cause.

19. A computer-implemented method for reporting anomalous metrics in a cloud computing system, the computer-implemented method comprising:
   in response to receiving an incident report request from a computing device, providing a set of anomalous metrics to an online generative language model;
   determining that an online model response threshold associated with the online generative language model has been satisfied;
   based on determining that the online model response threshold has been satisfied, providing a set of anomalous metrics and a set of queries to a fallback model;
   determining, utilizing the fallback model, a root cause for the set of anomalous metrics based on analyzing mappings within a root cause datastore;
   based on receiving text responses from the fallback model, generating an incident report that includes a summary text response, a root cause text response, and a mitigation text response; and
   responding to the incident report request by providing the incident report to the computing device.

20. The computer-implemented method of claim 19, further comprising:
   in response to receiving the incident report request, providing the set of anomalous metrics and a first set of prompts to an online generative language model to receive the text responses before providing the set of anomalous metrics to the fallback model; and
   determining that an online model response threshold associated with the online generative language model has been satisfied without receiving the text responses from the online generative language model.

* * * * *